(12) United States Patent     (10) Patent No.: US 9,291,149 B1
Hostetler     (45) Date of Patent: Mar. 22, 2016

(54) WIND AND WATER TURBINE WITH FINS TRAVELLING ALONG A GUIDE TRACK

(71) Applicant: Lester Hostetler, Sarasota, FL (US)

(72) Inventor: Lester Hostetler, Sarasota, FL (US)

(\*) Notice: Subject to any disclaimer, the term of this patent is extended or adjusted under 35 U.S.C. 154(b) by 382 days.

(21) Appl. No.: 13/773,920

(22) Filed: Feb. 22, 2013

Related U.S. Application Data

(63) Continuation-in-part of application No. 12/646,122, filed on Dec. 23, 2009, now abandoned, and a continuation-in-part of application No. 12/206,623, filed on Sep. 8, 2008, now Pat. No. 8,076,791.

(51) Int. Cl.
    *F03B 13/00*     (2006.01)
    *F03D 1/06*     (2006.01)
    *F03B 13/22*     (2006.01)

(52) U.S. Cl.
    CPC .. *F03D 1/06* (2013.01); *F03B 13/22* (2013.01)

(58) Field of Classification Search
    CPC ............ F03B 7/00; F03B 13/12; F03B 13/16; F03B 13/22; F03B 13/264; Y02E 10/28; Y02E 10/48; Y02E 10/74
    USPC .................... 290/43, 44, 54, 55; 416/86, 101; 415/3.1; 406/191, 192
    See application file for complete search history.

(56) References Cited

U.S. PATENT DOCUMENTS

| | | | | |
|---|---|---|---|---|
| 1,293,262 | A | * | 2/1919 | Walker .......................... 416/101 |
| 4,237,384 | A | * | 12/1980 | Kennon .......................... 290/55 |
| 6,926,491 | B2 | * | 8/2005 | Migler .......................... 415/4.4 |

\* cited by examiner

*Primary Examiner* — Thomas Truong
(74) *Attorney, Agent, or Firm* — Camoriano and Associates (57) ABSTRACT

A power generator system provides a wind or water powered wheel having pairs of radially positioned arms each having a shaft with independently rotating fins or paddles so the fins are oriented at different angles as the main shaft rotates to allow for increased power generation and reduced drag.

6 Claims, 11 Drawing Sheets

WIND AND WATER TURBINE WITH FINS TRAVELLING ALONG A GUIDE TRACK

This is a continuation-in-part of U.S. patent application Ser. No. 12/646,122, filed Dec. 23, 2009, which is a continuation-in-part of U.S. patent application Ser. No. 12/206,623 filed 8 Sep. 2008, now U.S. Pat. No. 8,076,791, the contents of which are herein incorporated by reference.

BACKGROUND OF THE INVENTION

Field of the Invention

The present invention relates generally to power generators and, more specifically, to a wind or water turbine with fins that rotate independently to maximize power generation.

SUMMARY OF THE PRESENT INVENTION

An object of the present invention is to provide a wind or water powered wheel whereby optimal fin position is obtained to provide maximum power generation.

DETAILED DESCRIPTION

Turning now descriptively to the drawings, in which similar reference characters denote similar elements throughout the several views, the figures illustrate one embodiment of a water and wind turbine made in accordance with the present invention. (Another embodiment is shown in my U.S. Pat. No. 8,076,791, which is hereby incorporated herein by reference.)

Figure 1:
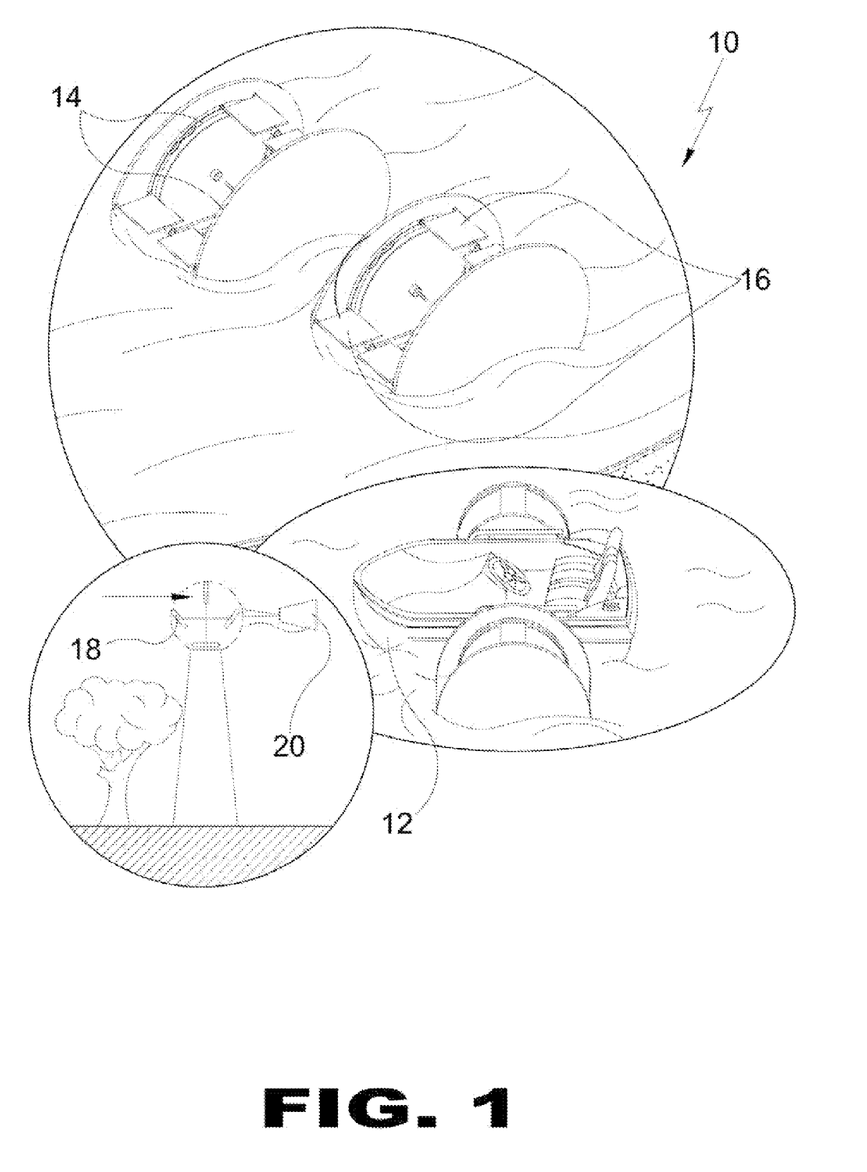
FIG. 1 is an illustrative view of a generator made in accordance with the present invention being used in both wind and water.

FIG. 1 is an illustrative view of the turbine and generator 10 in use powered by wind or water pressure. A pair of spaced apart stationary housing plates 14 have a plurality of fins 16 angularly disposed therebetween into optimum positioning for maximum driving and power. Additionally, the turbine and generator 10 may be utilized as a wind driven turbine 18 having a vane 20. In a reversed scenario, the turbine may also be utilized as a propulsion means for watercraft 12.

Figure 2:
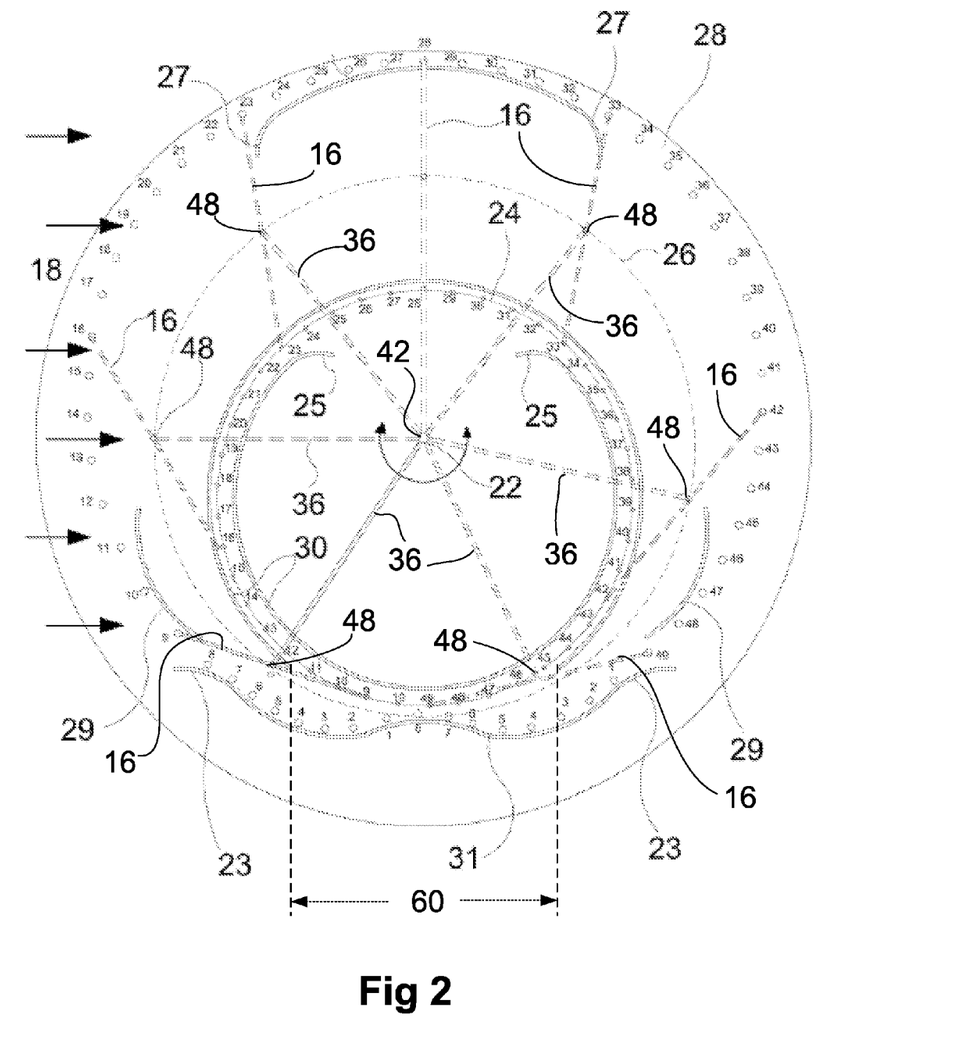
FIG. 2 is a side view of the generator of FIG. 1.
Figure 6:
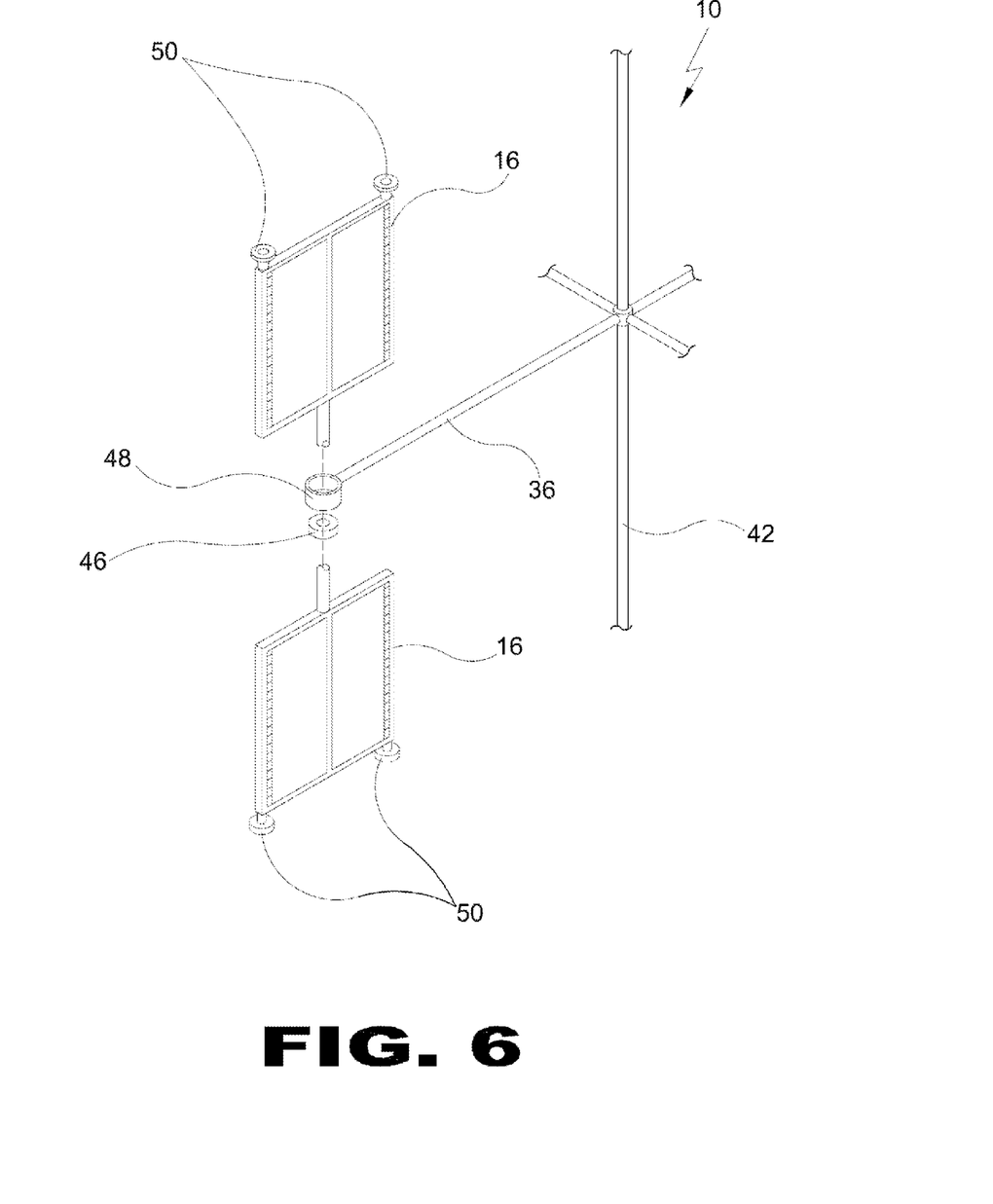
FIG. 6 is an exploded perspective view showing the fins and shafts of the generator of FIG. 1.
Figure 8:
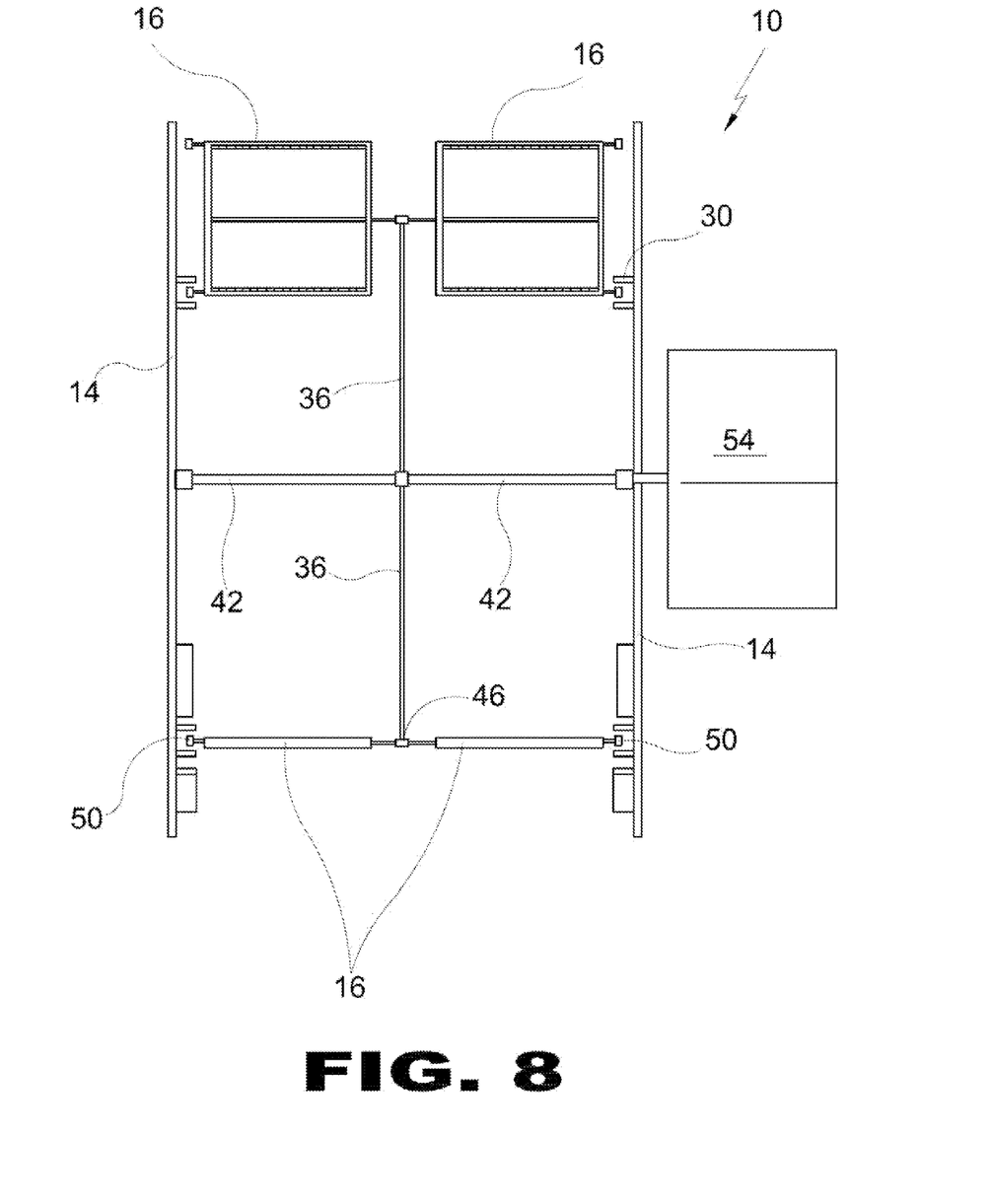
FIG. 8 is a front view of the generator of FIG. 1, showing the connections between the turbine, arms, fins, and generator.

FIG. 2 is a side view of the wind/water turbine of the present invention in use with wind 18. The turbine comprises spaced apart stationary housing plates 14 with a main shaft 22 rotatively mounted therebetween. The main shaft is also called a main axle 42, as shown in FIGS. 6 and 8. The stationary housing plates 14 have magnetic tracks 30, magnetic guides 29 and a magnetic stud transfer guide 31 attached thereto for constraining and guiding fins 16 through a cyclical path driven by wind 18. The fins 16 are rotatively mounted to arms 36 which are fixedly attached to a main shaft 22, which is used to drive a generator. The fins 16 are shown in phantom in FIG. 2, and it can be seen that they are driven through a cycle in which they pivot from a vertical orientation to a horizontal orientation and then return to a vertical orientation. Since the track 30 is eccentric relative to the axis of rotation of the main shaft 22, it can guide the studs on the fins 16 and cause each of the fins 16 to pivot about the respective fin axis (the axis of the collar 48) as the main shaft 22 rotates.

Looking at FIG. 2, it can be seen that the fin 16 at the 9 o'clock position has its upper stud in the leading position outside of the track 30 and its lower stud in the trailing position inside the track 30. As the main shaft 22 rotates clockwise, when that fin 16 reaches the 12 o'clock position, it is in a vertical orientation. Its upper (leading) stud is on the outside of the outer guide 27, and its lower stud is between the ends 25 of the track 30. As the main shaft 22 continues to rotate clockwise, the lower stud of the fin 16 (which had been the trailing stud) enters into the inside of the track 30 and becomes the leading stud as it travels inside that track 30 until it reaches the lower gap 60 in the outer portion of the track 30, at which point it leaves the track and is guided by the guides 31 and 29 to the outside of the track 30, which also guide the other stud (which has now become the trailing stud) to the inside of the track 30. When the fin 16 reaches the six o'clock position, just before the trailing stud enters the inside of the track 30, the fin 16 has a horizontal orientation. It may also be appreciated that the fin axis 48 for each of the fins 16 follows an imaginary path 26 centered on the main axle 42, and that the track 30 is eccentric relative to the main axle 42.

Figure 3:
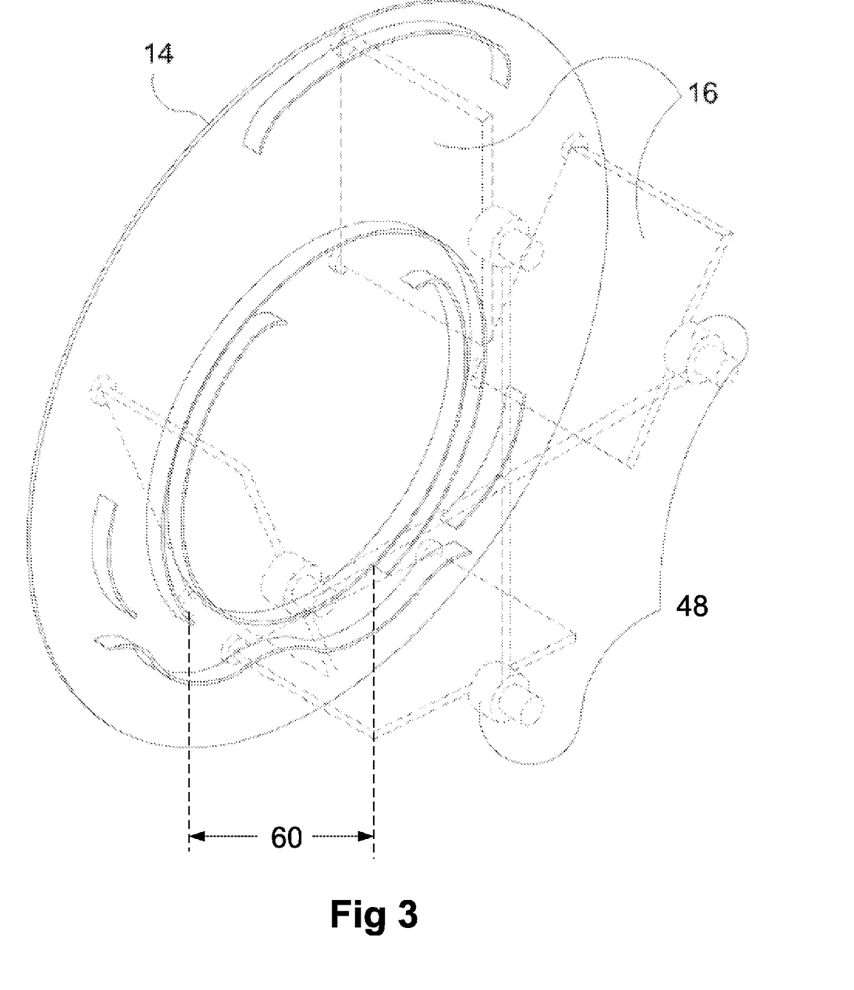
FIG. 3 is a perspective view of one of the side plates of the generator of FIG. 1, with the fins shown in phantom.

FIG. 3 shows the orientation of one of the plates when the turbine is being used with wind. The fins 16 are independently moveable one from the other whereby one is driven through a vertical plane while the opposed fin 16 is driven through a horizontal plane.

Figure 4:
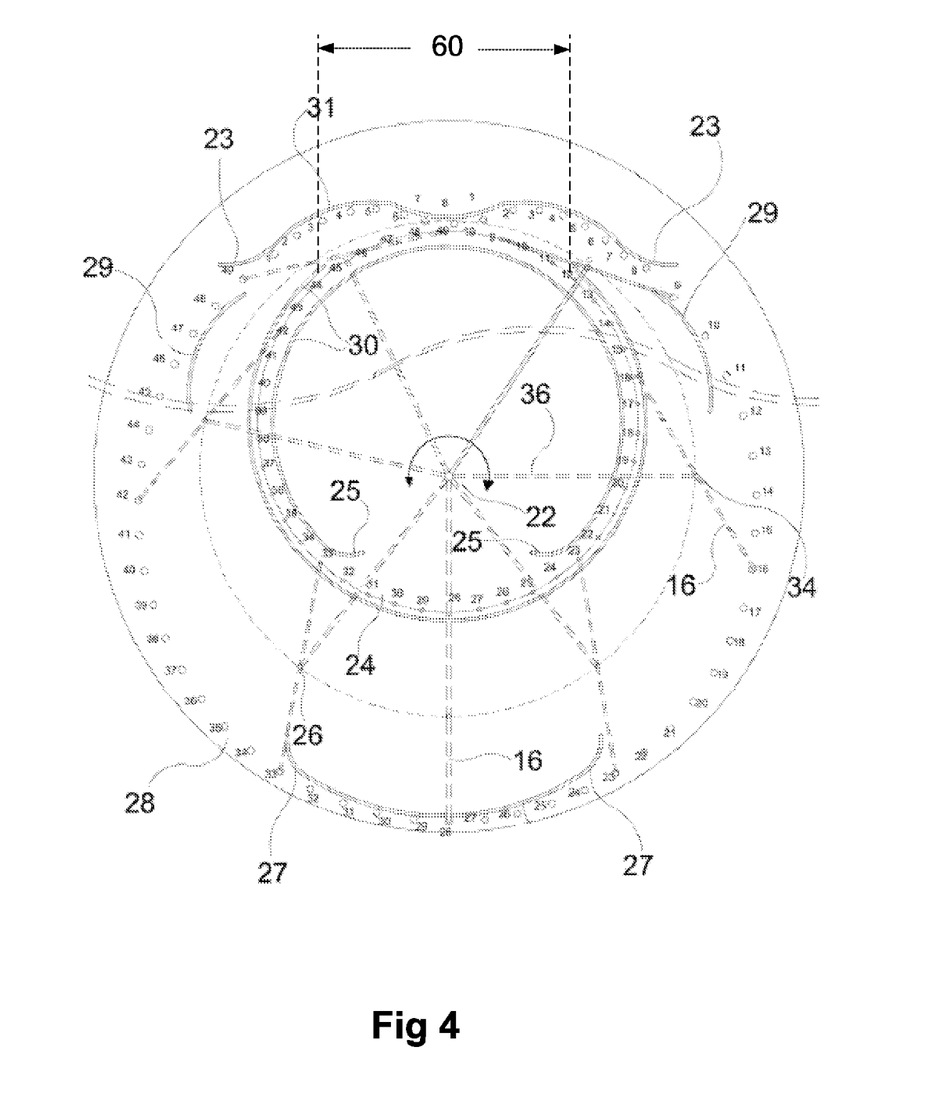
FIG. 4 is another side view of the generator of FIG. 1, similar to the view in FIG. 2.

FIG. 4 is a side view of one of the plates oriented for use with a flowing liquid, such as water. Shown is a turbine powered by a moving water 18 generator having magnetic fin guides 30 as a friction reduction system. The system comprises a support having magnetic tracks and guide positioned thereon whereby a main shaft 22 having arms 36 terminating in rotative fins 16 with magnetic tracks 30 constraining the fins 16 to a prescribed path 28, the inner track 24, while being driven by the water-energy to store potential energy produced from the kinetic energy of the water-energy. The fins 16 are driven through a cycle having a vertical orientation through a horizontal orientation before returning to a vertical orientation.

Figure 5:
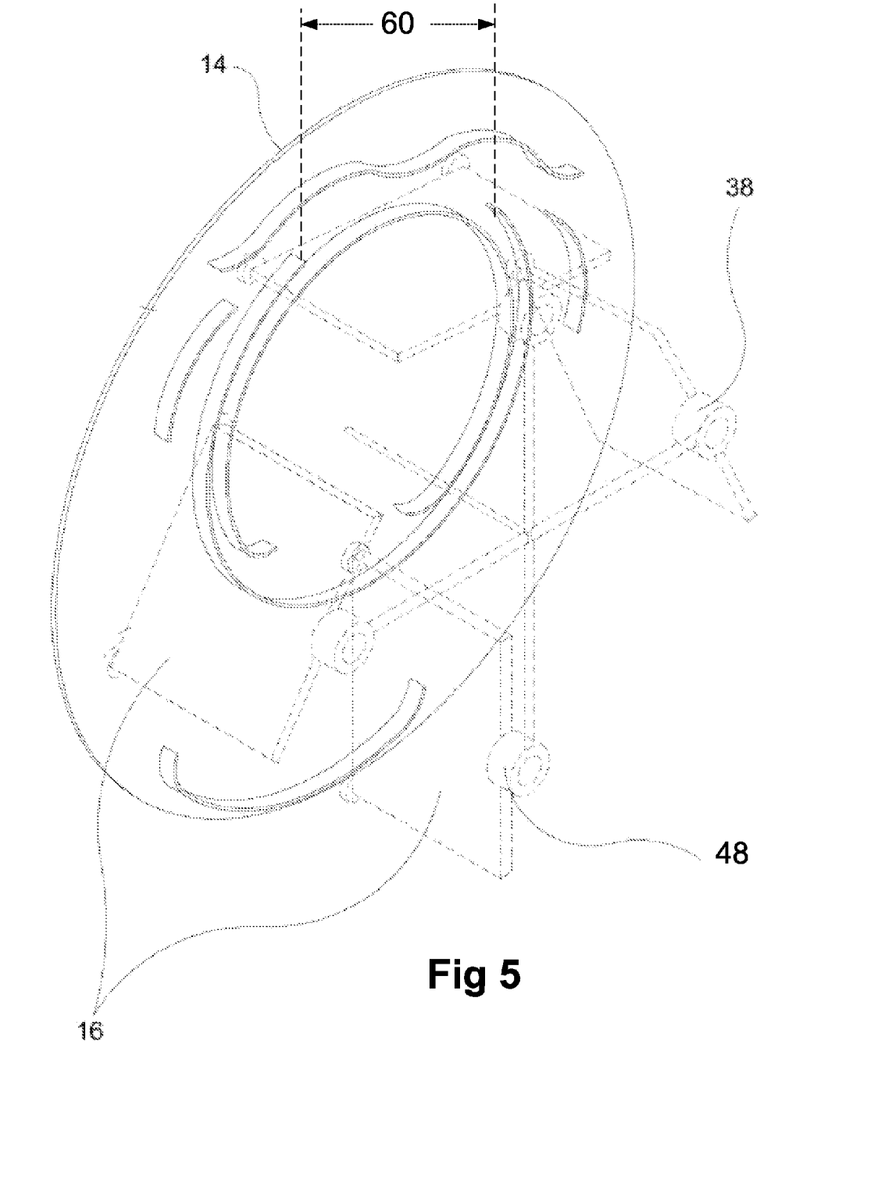
FIG. 5 is another perspective view of one of the side plates of the generator of FIG. 1, with the fins shown in phantom, similar to FIG. 3.

FIG. 5 is an illustrative view of the present invention in use with a flowing liquid. The fins 16 are independently moveable one from the other whereby one is driven in a vertical plane while the opposed fin 16 is driven in a horizontal plane.

FIG. 6 shows the main shaft 42 with a plurality of supporting arms 36 radially projecting therefrom with the distal end of each having a bearing 46 rotatively connected to a pair of fins 16, having one on each side of the arm 36, which rotates with the main shaft 42. Each fin 16 has magnetic studs 50 attached proximate to two outer corners. While one said magnetic stud 50 runs along a channel in a circular track of smaller diameter than that of the arm 36, the angle that each fin 16 rotates is controlled, in order to transfer maximum energy to the main shaft 42. It should be noted that the track need not necessarily be circular. The shape of the track may be designed as desired to achieve the optimal fin position.

Figure 7:
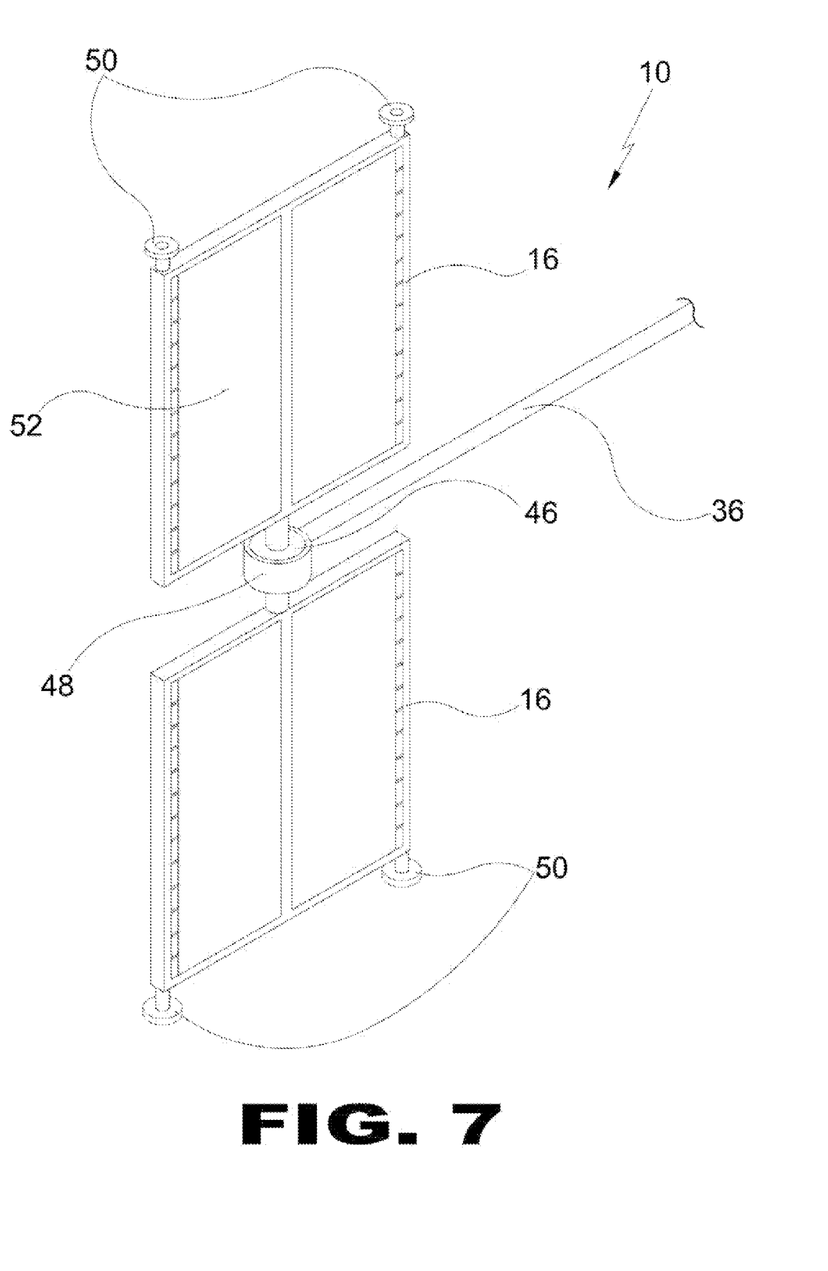
FIG. 7 is a detailed view of the fins of FIG. 6.
Figure 10:
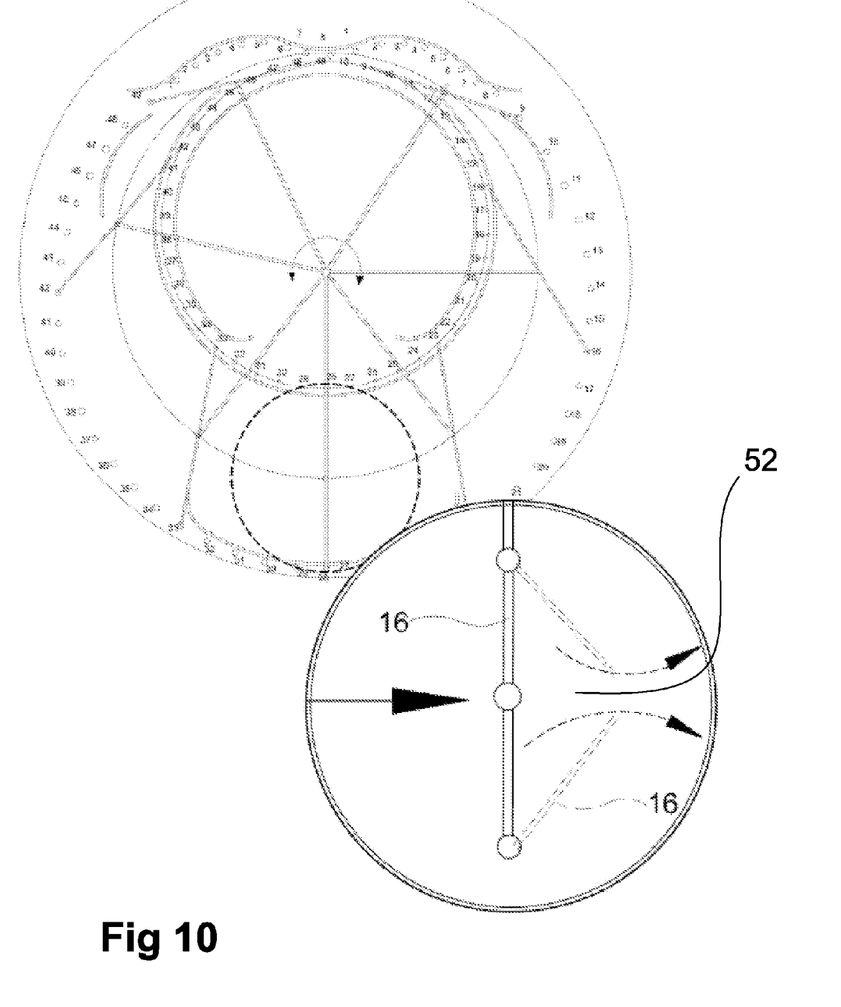
FIG. 10 is an exploded view of the water turbine showing the direction of the water flow through the fins as it passes through the generator.

FIG. 7 is a detailed view of the fin 16, arm 36 and magnetic studs 50. This wind or water powered wheel provides pairs of radially positioned arms 36 with each having a shaft with a pair of fins 16 pivotally attached thereto via a bearing 46 in collar 48. The fins 16 are independently movable from each other. One pair of fins 16 is driven in a vertical plane while the opposed pair of fins 16 is driven in a horizontal plane. Additionally shown is a pressure release gate 52 whereby under the incident of extreme weather, the fins 16 can pivot as shown in FIG. 10, to permit flow that otherwise would destroy the fin 16 if opposed.

FIG. 8 is a front view of the turbine and generator combination 10 with the generator 54 being shown connected to the main shaft 42. It can be seen in this view that the pair of fins 16 at the top are in a vertical position, while the pair of fins 16 at the bottom are in a horizontal to optimize the harvesting of energy while reducing drag.

Figure 9:
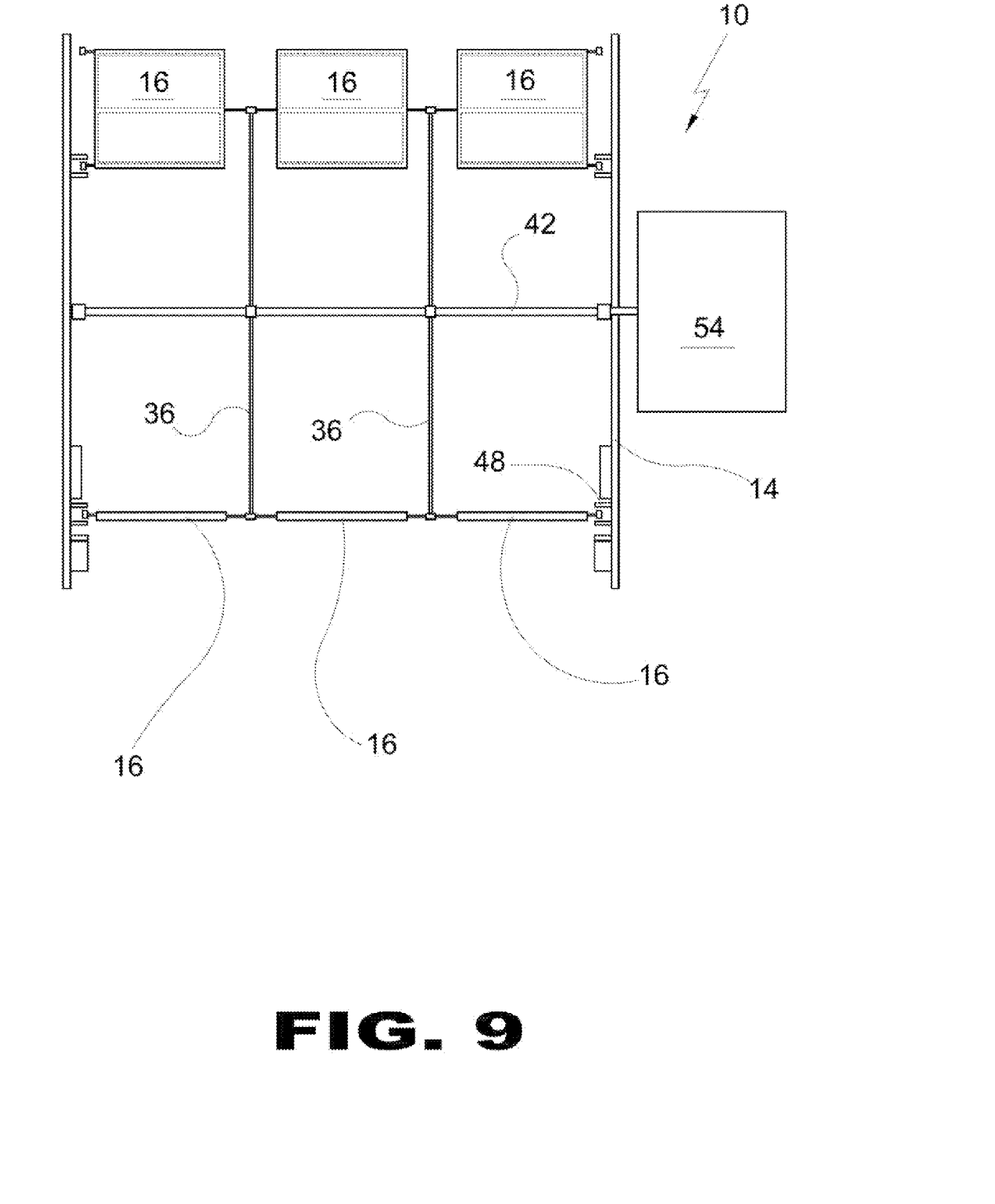
FIG. 9 is a front view similar to FIG. 8 but showing a greater number of fins which may be used in the turbine.

FIG. 9 is similar to FIG. 8 but shows that the turbine may be expanded and ganged with a plurality of fins 16 and arms 36 operating on a common main shaft 42 and generator 54 as the magnets travel through the tracks 30 of the stationary plates 14.

Figure 11:
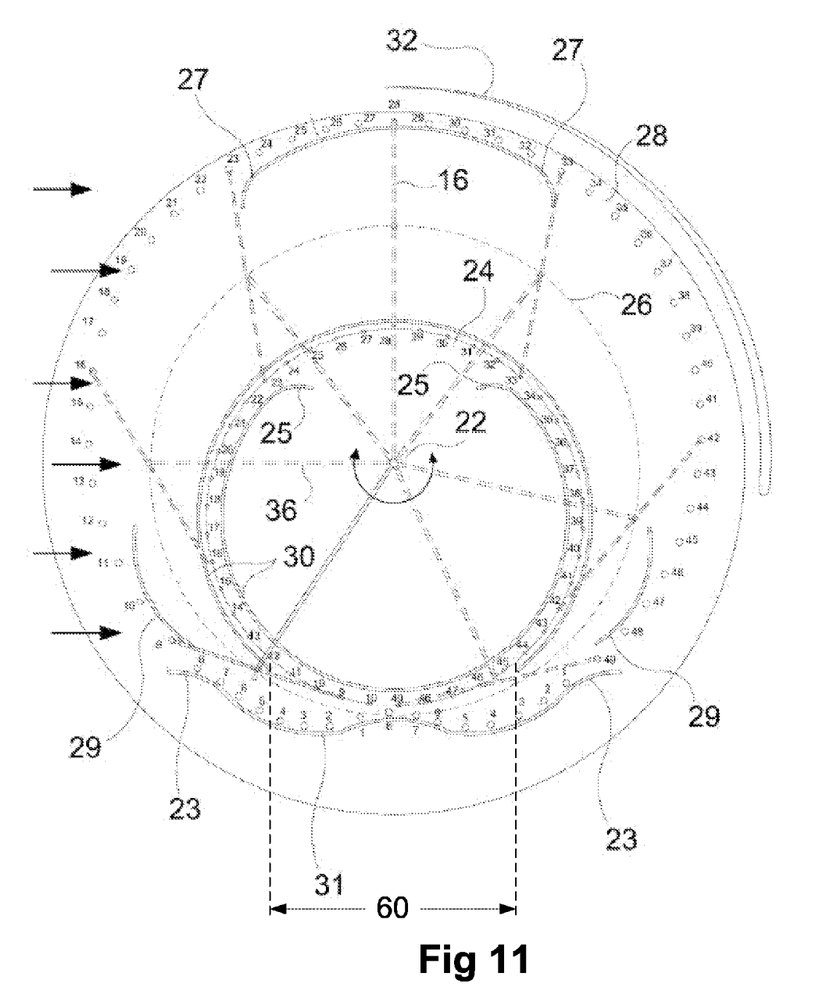
FIG. 11 is a side view of the generator of FIG. 1 with a cover added to prevent fluid from escaping.

FIG. 11 is an illustrative view of the wind or water turbine having an added cover 32. The cover 32 is placed above the wind or water turbine and prevents fluid escape.

What is claimed is:

1. A turbine powered by a moving fluid, comprising:
   a) spaced apart stationary housing plates, at least one of said housing plates defining a track;
   b) a main shaft extending between said stationary housing plates and mounted for rotation relative to said stationary housing plates about a first axis;
   c) a plurality of arms radially extending from said main shaft;
   d) at least one fin rotatably attached to each of said arms for rotation about a fin axis, wherein each fin is operably guided by the track at a location offset from the fin axis such that the fins pivot as the main shaft rotates, with each fin pivoting from a vertical orientation at a first angular position of the arm on which the fin is mounted to a horizontal orientation at a second angular position of the arm that is diametrically opposed to the first angular position, and then to the vertical orientation as the fin returns to the first angular position.

2. A turbine powered by a moving fluid according to claim 1, wherein said track is magnetic.

3. A turbine powered by a moving fluid as recited in claim 2, further comprising a pressure release gate for releasing said fin when subjected to a flow stronger than a predetermined maximum intensity.

4. A turbine powered by moving a fluid as recited in claim 2, wherein said magnetic track is positioned such that it maintains optimal fin position in either direction of rotation of the main shaft.

5. A turbine powered by a moving fluid as recited in claim 1, wherein the guide track is eccentric relative to axis of the main shaft.

6. A turbine powered by a moving fluid as recited in claim 1, wherein each fin includes a lead stud and a trailing stud and wherein the track defines a gap, wherein, as the main shaft rotates, the lead stud travels within the track until reaching the gap, whereupon the lead stud leaves the track and the trailing stud enters the track.

* * * * *